Oct. 17, 1967 M. J. CHALOUPKA 3,347,987

TELEPHONE CALL-RESPONSIVE AUTOMATIC TELEMETERING SYSTEM

Filed June 10, 1964 3 Sheets-Sheet 1

MILOSLAV J. CHALOUPKA
INVENTOR.

BY James A. Bargfrede

ATTORNEY

TELEPHONE CALL-RESPONSIVE AUTOMATIC TELEMETERING SYSTEM

Filed June 10, 1964 3 Sheets-Sheet 2

MILOSLAV J. CHALOUPKA
INVENTOR.

BY James A. Bargfrede

ATTORNEY

Oct. 17, 1967 M. J. CHALOUPKA 3,347,987

TELEPHONE CALL-RESPONSIVE AUTOMATIC TELEMETERING SYSTEM

Filed June 10, 1964 3 Sheets-Sheet 3

MILOSLAV J. CHALOUPKA
INVENTOR.

BY James A. Bargfrede
ATTORNEY 3,347,987
Patented Oct. 17, 1967

3,347,987

TELEPHONE CALL-RESPONSIVE AUTOMATIC TELEMETERING SYSTEM

Miloslav J. Chaloupka, Houston Tex., assignor to Odex Engineering Company, Houston, Tex., a corporation of Texas Filed June 10, 1964, Ser. No. 373,939
1 Claim. (Cl. 179—2)

ABSTRACT OF THE DISCLOSURE

Circuit for coupling to a conventional telephone system to indicate selected conditions at a remote station, said circuit including free running phase shift oscillator means which provides a continuous tone of a particular frequency, flip-flop circuit means, first timer circuit means, second timer circuit means, and signal amplifier means.

This invention pertains generally to electrical control circuits and particularly to a control circuit adaptable for use in monitoring and controlling one or more devices from a remote location through use of a conventional telephone system.

As automation increases in almost all areas of industrial production and control, increased use is being made of existing facilities and systems for achieving functions and results which have not been obtained previously. For example, in the field of remotely controlling and monitoring wells in oil and gas fields, remote controlling and monitoring generally will provide decreased labor cost combined with increased efficiency and relaibility.

Although various methods, systems, and devices have been utilized in the past in an attempt to satisfactorily control and monitor various functions in oil and gas fields, such methods, systems, and devices generally have been complex and therefore expensive to install and maintain. Also, such methods, systems, and devices have not been completely reliable and effective and, therefore, have not been of optimum design.

Thus, it is an object of the present invention to provide an improved control system and monitor system.

Another object of the present invention is to provide an improved control and monitor system which is particularly adaptable for use in controlling equipment in an oil or gas field through the use of a conventional telephone system.

Yet another object of the persent invention is to provide an improved control system characterized by means which is adaptable for use with a conventional telephone system to provide remote control and monitoring.

A further object of the present invention is to provide a control and monitoring system which is reliable, compact, easy to maintain, and low in initial cost and in maintenance cost.

A still further object of the invention is to provide a telephone system component which allows one or more devices to be controlled and monitored with minimum electric power requirements as compared with known components.

Briefly stated, the present invention provides a control and monitor system which utilized conventional, existing telephone facilities. The present invention may be utilized for monitoring the function of various devices or conditions, particularly devices and conditions in an oil or gas field and the present invention may be further utilized in providing a change in the condition of devices in an oil or gas field. The invention includes an electrical circuit which is adaptable for use with a conventional telephone system. Such electrical circuit is positioned in proximity to an existing telephone and when such telephone is called through a conventional telephone dial system, the electrical circuit of the present invention allows the telephone which has been called to be answered and a signal transmitted from the answered telephone to indicate the condition of a device at the called telephone station.

Figure 1:
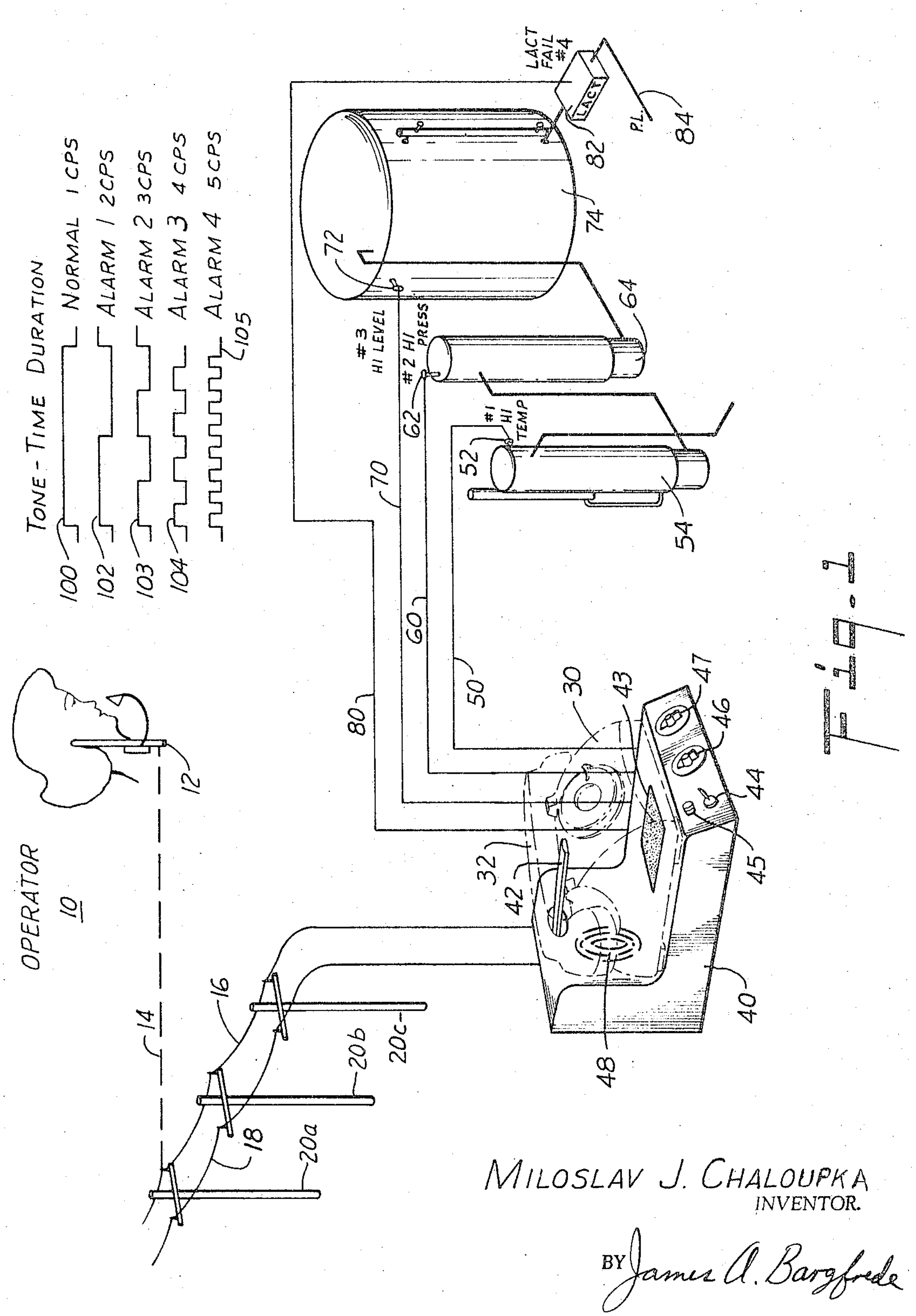
FIGURE 1 is a diagrammatic layout showing one application of the present invention.

Referring now to the drawings in detail, FIGURE 1 is a diagrammatic layout showing one application of the present invention. An operator 10 is provided with a known headset and mouthpiece 12 which is coupled through lead 14 to telephone lines 16 and 18. Telephone lines 16 and 18 extend along a plurality of poles 20A, 20B and 20C in a manner well known in the telephone system art and such lines are coupled to a conventional telephone device identified as 30. The conventional telephone 30 is positioned on a housing 40. Housing 40 has a receiver lift 42 extending from the upper portion to allow lifting of the headpiece 32 of the telephone 30. Housing 40 is positioned adjacent the telephone 30 with the receiver lift 42 extending below the headpiece 32.

When the operator 10 dials the telephone in a conventional manner, the receiver lift 42 causes the headset 32 to be lifted so that the telephone 30 is "answered." The housing 40 may be coupled through lead 50 to various devices, for example, to a high temperature indicating switch device 52 which may be coupled to a vessel 54. Lead 60 from the housing 40 may be coupled to a high-pressure indicating switch device 62 on another vessel 64. Line 70 may be coupled to a high level switch device 72 on storage tank 74. Lead 80 may be coupled to a switch device 82 in a lease automatic custody transfer (LACT) unit coupled to a pipeline 84.

Housing 40 includes a sensing coil 43, an on-off switch 44, pilot light 45, and a speaker 48. Also, a time duration adjustment 46 is provided on housing 40 along with a sensitivity adjustment 47.

Thus, when the telephone 30 has been dialed and the headpiece 32 has been lifted from the telephone unit by the receiver lift 42, operator 10 will receive, for example, a one pulse-per-second tone from the speaker 48 to indicate a normal condition of the particular device which is being monitored. A typical tone time duration pulse is shown as one cycle per second and indicated as tone 100 in FIGURE 1. If the condition is other than normal the pulse rate of the tone will vary. For example, if a high level exists in the storage tank 74, the pulse rate may be two cycles-per-second to indicate an alarm #1 identified as 102 in FIGURE 1. If high temperature, low temperature, low level, or any other condition thought desirable to be monitored exists on the lease location which has been dialed, the pulse rate may vary from two to ten pulses-per-second depending upon the alarm or off-normal condition which is present. Alarm #2 may be three cycles-per-second as indicated as 103 in FIGURE 1 and alarm #3, for example, may be four cycles-per-second and is indicated as 104 in FIGURE 1. Alarm #4 may be five cycles-per-second and is indicated as 105 in FIGURE 1.

After the signal from the called station has been received by the operator, and the condition noted by the operator, the receiver lift 42 is lowered after a selected time duration and the telephone headset 32 is repositioned in the cradle of the telephone 30.

Thus, the use of the invention as indicated in FIGURE 1 requires no modifications to be made to the existing telephone system. The telephone 30 is positioned on the housing 40 which contains circuitry which will be explained in detail subsequently, and suitable alarm sensing devices such as switches which are responsive to level, pressure, flow, or other conditions are tied to the input terminals of the housing 40. A suitable source of power is provided to housing 40 and such source of power may be 110 volts A.C. or a direct current source in areas where conventional 110 volt alternating current power is not available.

Figure 2:
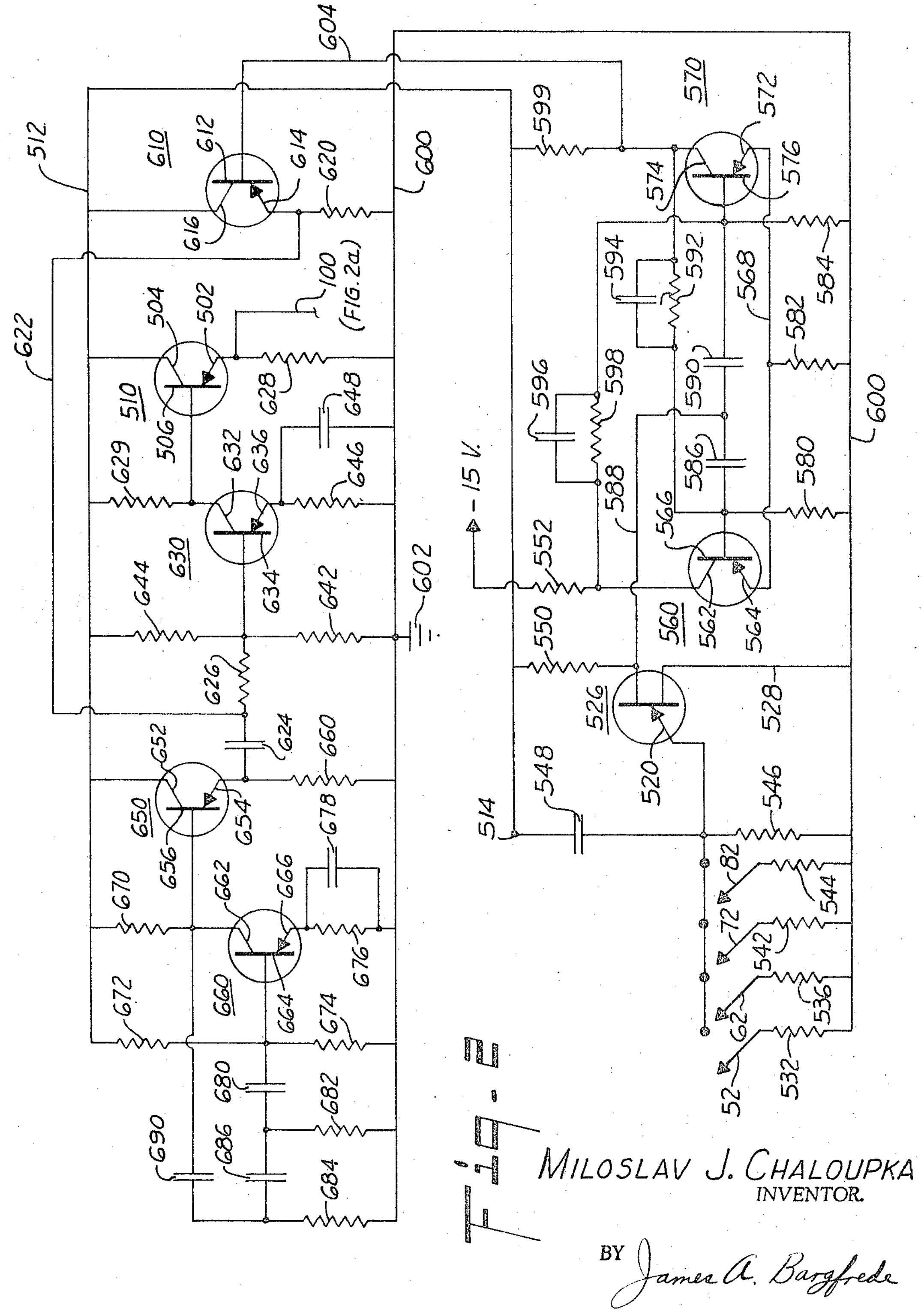
FIGURE 2 is a circuit schematic showing a portion of the circuit of the present invention.
Figures 2A, 3:
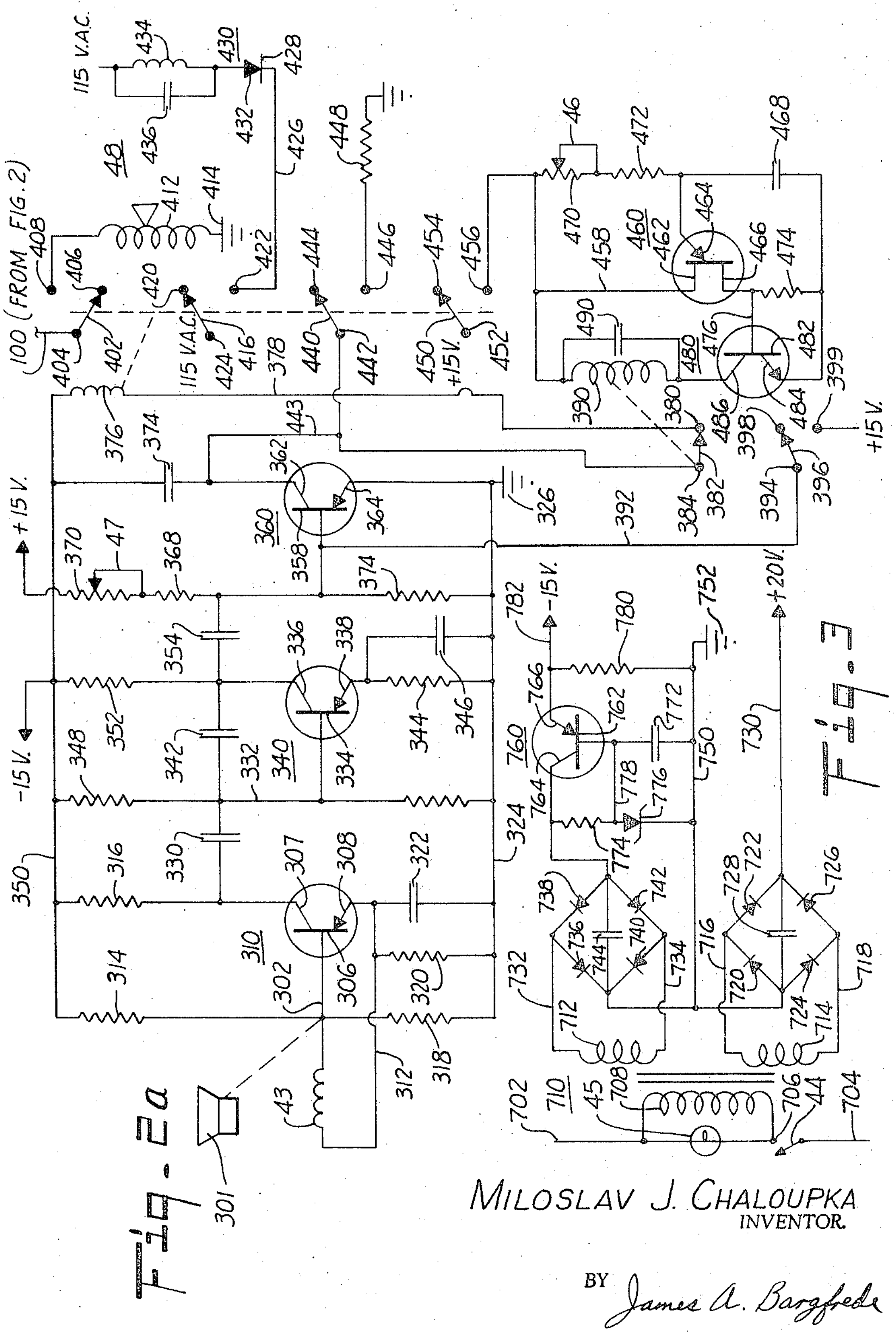
FIGURE 2A is a circuit schematic showing the remaining portion of the circuit of the present invention.
FIGURE 3 is a circuit schematic of a power supply which may be utilized with the present invention.

FIGURE 2 and FIGURE 2A are circuit schematic diagrams showing the circuit provided within housing 40. The circuit shown in FIGURES 2 and 2A may be divided generally into several parts, namely, a free running phase shift oscillator means which provides a continuous tone of a particular frequency, flip-flop circuit means which provides the usual function of a flip-flop circuit well known in the art, first timer circuit means, second timer circuit means, and signal amplifier means for amplifying a signal initiated by the ringing of the dialed telephone. A sensing coil 43 is provided in the circuit for sensing when the telephone begins to ring at the dialed location. Sensing coil 43 has voltage induced therein by the flux field generated by the telephone ringing transformer (not shown). Sensing coil 43 is coupled through lead 302 to the base 306 of transistor 210. Acoustical device 301 which may be a microphone may be coupled in place of coil 43 when the present invention is utilized on a party-line telephone system. Transistor 310 includes a collector 307 and an emitter 308. Coil 43 is coupled through lead 312 to emitter 308 and base 306 is coupled through resistors 314 and 316 to collector 307. Resistor 318 is coupled between base 306 and the parallel combination of resistor 320 and capacitor 322, resistor 320 and capacitor 322 being coupled to the emitter 308 of transistor 310. Lead 324 provides a ground potential coupling at 326 to resistors 318, 320, and capacitor 322.

Collector 307 of transistor 310 is coupled through capacitor 330 and through lead 332 to the base 334 of transistor 340. Collector 336 of transistor 340 is coupled to base 334 of transistor 340 through capacitor 342. The emitter 338 of transistor 340 is coupled to ground potential through the parallel coupling of resistor 344 and capacitor 346. Resistor 348 is coupled through lead 332 to the base 334 of transistor 340 and to a source of negative potential which may be a minus 15 volts through lead 350. Resistor 352 likewise is coupled between the source of minus 15 volts potential on lead 350 and collector 336 of the transistor 340. Capacitor 354 is coupled between the collector 336 of transistor 340 and the base 358 of transistor 360. Transistor 360 includes a collector 362 and an emitter 364. The base 358 of transistor 360 is coupled through resistor 368 and through variable resistor 370 to a source of positive potential which may be 15 volts positive. Variable tap 372 is coupled between resistors 368 and 370. Variable tap 372 is the sensitivity adjustment 47 shown in FIGURE 1. Base 358 of transistor 360 is coupled through resistor 374 to ground potential on lead 324.

Capacitor 374 is coupled between the collector 362 of transistor 360 and relay coil 376. Relay coil 376 is coupled through lead 378 to terminal 380. Contact 382 coupled to terminal 384 is actuated by relay coil 390. Lead 392 is coupled between the base 358 of transistor 360 and terminal 394. Terminal 394 has a contact 396 which may be coupled to terminal 398 or terminal 399 depending upon whether or not relay coil 390 is energized. Contact 399 is coupled to a source of positive potential which may be 15 volts positive.

Upon energization of relay coil 376 after the signal from sensing coil 43 has been amplified, contact 402 coupled through terminal 404 to lead 100 of FIGURE 2 moves from contact 406 to contact 408. Contact 408 is coupled to a speaker 48 having a coil 412 coupled between terminal 408 and ground potential 414. As will be explained subsequently, speaker 48 provides tone pulses to the headpiece of the telephone which was called and answered. Contact 416 is moved from terminal 420 to terminal 422 upon energizing of relay coil 376 so that 115 volts alternating current is provided from terminal 424 through lead 426. Lead 426 is coupled from terminal 422 to the cathode 428 of diode 430. Anode 432 of diode 430 is coupled to coil 434 which is coupled to a source of alternating current potential which may be 115 volts A.C. Capacitor 436 is coupled across the coil 434. Coil 434 is the solenoid coil for raising the receiver of the telephone which has been dialed.

Also, upon energization of relay coil 376 contact 440 coupled to terminal 442 moves from terminal 444 to terminal 446. Terminal 446 is coupled to ground potential through resistor 448. Terminal 442 is coupled through lead 443 to the collector 362 of transistor 360. Also, upon energizing of coil 376 contact 450 coupled to terminal 452 is moved from terminal 454 to terminal 456. Terminal 452 is coupled to a source of positive potential which may be 15 volts positive.

Terminal 456 is coupled to #2 timer network for energizing coil 390. Contact 456 is coupled through lead 458 to one base 462 of unijunction transistor 460. Also, terminal 456 is coupled through resistors 470 and 472 to the emitter 464 of unijunction transistor 460. Resistor 470 is a variable resistor having a tap 46 which controls the time duration of transmission of an audible tone. Tap 46 was shown in FIGURE 1 on housing 40. Emitter 464 is coupled through capactor 468 and resistor 474 to the second base 466 of unijunction transistor 460. The second base 466 of unijunction transistor 460 is coupled through lead 476 to the base 482 of transistor 480. The emitter 484 of transistor 480 is coupled to resistor 474 and the collector 486 is coupled to coil 390. Capacitor 490 is coupled across coil 390. Thus, timer #2 network, according to the adjustment of resistor 470 by variable tap 46, causes conduction of transistor 480 with a pulse being provided through lead 476 so that coil 390 is energized after a selected period of time thereby moving contact 382 and contact 396. When contact 382 is moved from the position shown in FIGURE 2, the coil 376 is deenergized. When contact 396 is moved to contact terminal 399 rather than terminal 398, a positive potential of plus 15 volts is provided to lead 392.

In order to understand the complete operation of the circuit provided within housing 40, FIGURE 2A shows lead 100 terminating at terminal 404 of contact 402 of relay 376. As shown in FIGURE 2 lead 100 is coupled to the emitter 502 of a transistor 510 which is part of a flip-flop circuit means. Such flip-flop circuit means provides pulses from the tone generator or free running phase shift oscillator means. Coupled to the flip-flop circuit means is the said free running phase shift oscillator means in the left upper portion of FIGURE 2 and timer #1 means in the lower portion of FIGURE 2.

Transistor 510 includes a collector 504, a base 506 and the emitter 502. Collector 504 is coupled to a common bus 512. Terminal 514 is coupled to lead 512. Contact 52 is coupled through resistor 532 to unijunction transistor 526 through lead 528. Contact 62 is coupled through resistor 536 to lead 528 of semiconductor device 526. Contact 72 is coupled through resistor 542 to lead 528. Contact 82 is coupled through resistor 544 to lead 528. Resistor 546 is coupled between the emitter 520 and one base of unijunction transistor 526 through lead 528. Capacitor 548 is coupled between emitter 520 of unijunction transistor 526 and lead 512. Resistor 550 is coupled between the second base of unijunction 526 and lead 512.

A source of negative direct current potential may be provided, for example minus 15 volts, through resistor 552 to the collector 562 of transistor 560. Emitter 564 of transistor 560 is coupled through lead 568 to the emitter 572 of transistor 570. The base 566 of transistor 560 is coupled through resistor 580 to bus 600 which is at ground potential at 602. Lead 568 is coupled through resistor 582 to bus 600. Resistor 584 is coupled from the base 576 of transistor 570 to bus 600. Capacitor 586 is coupled between the base 566 of transistor 560 and resistor 550 through lead 588. Lead 588 is coupled to capacitor 590 and capacitor 590 is coupled to the base 576 of transistor 570. Coupled between the base 566 and the collector 574 is the resistor 592 and capacitor 594, capacitor 594 and resistor 592 being in parallel. Capacitor 596 and resistor 598 are coupled in parallel between the base 576 of transistor 570 and resistor 552. Resistor 599 is coupled between the collector 574 of transistor 570 and the common bus 512. Lead 604 is coupled between the collector 574 of transistor 570 and the base 612 of transistor 610. Emitter 614 of transistor 610 is coupled through resistor 620 to ground potential through bus 600. Collector 616 of transistor 610 is coupled to bus 512. The emitter 614 of transistor 610 is coupled through lead 622 to the junction of capacitor 624 and resistor 626.

Emitter 502 of transistor 610 is coupled to common ground bus 600 through resistor 628. Base 506 of transistor 510 is coupled through resistor 629 to bus 512. Base 506 of transistor 510 is also coupled to the collector 632 of transistor 630. The base 634 of transistor 630 is coupled to resistor 626 to resistor 642 and to resistor 644. Emitter 636 is coupled to resistor 646 and capacitor 648. Resistor 646 and capacitor 648 are coupled to common bus 600.

Transistor 650 has the collector 652 thereof coupled to common bus 512. The emitter 654 of transistor 650 is coupled to capacitor 624 and to resistor 660. Resistor 660 is coupled to common bus 600. Base 656 of transistor 650 is coupled to the collector 662 of transistor 660. The collector 662 of transistor 660 is coupled through resistor 670 to common bus 512. The base 664 of transistor 660 is coupled to resistor 672 which is coupled to common bus 512 and to resistor 674 which is coupled to common bus 600. Emitter 666 of the transistor 660 has resistor 676 and capacitor 678 coupled in parallel between emitter 666 and bus 600. Capacitor 680 is coupled to the base 664 of transistor 660 and to resistor 682. Resistor 682 is coupled to common bus 600. Resistor 684 is coupled between common bus 600 and capacitor 686 which is also coupled to capacitor 680. Capacitor 690 is coupled between capacitor 686 and the base of transistor 650.

Thus, when the circuit shown in FIGURE 2 and FIGURE 2A is energized, the free running phase shift oscillator means including transistors 660 and 650 are coupled to flip-flop circuit means including transistors 630, 510 and 610 and the flip-flop circuit means are coupled to timer means #1. The timer means #1 includes transistors 560, 570 and unijunction transistor 526. When the sensing coil 43 shown in FIGURE 2A is actuated when the phone begins to ring the solenoid 434 causes the dialed telephone receiver headset to be raised for a period of time determined by the setting of variable tap 46. Variable tap 46 controls the length of the transmission of the audible tone which is provided through speaker coil 412 of speaker 410. The pulses which are transmitted by speaker 410 to the headset of the dialed telephone are controlled by the #1 timer means shown in FIGURE 2 since the closing of the switches on the devices being monitored couples the resistors in the circuit and alters the tone pulses transmitted over the answered telephone. The pulse to interrupt the power to deenergize relay 376 is provided by the pulsing of relay 390 according to the time duration selection setting of the variable resistor of the timer #2 means.

FIGURE 3 is a circuit schematic showing a typical power supply circuit which may be utilized with the present invention when 115 volts alternating current is available. A conventional 115 volt A.C. source is provided through lead 702 and lead 704. Disposed in lead 704 is a switch 44 adapted for engagement with contact 706. Switch 44 is shown on housing 40 in FIGURE 1. Coupled between contact 706 and lead 702 is an indicating lamp 45 which is across the primary winding 708 of transformer 710. Lamp 45 also is shown in FIGURE 1. Transformer 710 has two secondary windings 712 and 714. Secondary winding 714 has leads 716 and 718 coupled to a rectifier circuit including diodes 720, 722, 724, and 726 along with capacitor 728. Lead 730 may provide a potential of 20 volts D.C. positive.

Secondary winding 712 is coupled through leads 732 and 734 to a rectifier circuit including diodes 736, 738, 740 and 742 along with capacitor 744. Ground bus 750 is coupled to ground 752. Transistor 760 has the base 762 coupled through capacitor 772 to bus 750. The collector 764 of transistor 760 is coupled through resistor 774 to diode 776 and to ground bus 750. Base 762 and the juncture of resistor 774 and diode 776 are coupled by lead 778. Emitter 766 of transistor 760 is coupled to ground potential through resistor 780. Lead 782 provides a potential of minus 15 volts D.C. Thus, FIGURE 3 shows a power supply which is adaptable for use with the circuit of the present invention to provide the necessary negative and positive direct current potential for the circuit of FIGURE 2 and FIGURE 2A.

Thus, the present invention provides circuit means for allowing a conventional telephone system to be utilized in the monitoring of a device or plurality of devices at a location remote from the location of an individual operator. The system of the present invention is reliable, effective, low in cost of initial installation, and low in maintenance cost. The system of the present invention and its related circuitry provide an effective and low cost system for monitoring devices which indicate certain conditions such as excessive temperature, pressure, or flow of liquids.

Although the present invention has been described in a preferred embodiment, the present invention is to be defined by the following claims. Although such claims may be presented in indented format to facilitate reading and understanding thereof, such indented format is not to be construed as a structural or functional limitation of the elements or steps recited in the claim.

I claim:

A circuit adapted for use with a conventional telephone device, said apparatus including in combination a power supply, circuit means coupled to said power supply and responsive to a call signal transmitted to said telephone device, said circuit means including a free running phase shift oscillator, flip-flop circuit means coupled to said free running phase shift oscillator, first timer means coupled to said flip-flop circuit means, said circuit means providing a coded signal, audible signal means coupled to said circuit means and responsive to said call signal, and second timer means coupled to said circuit means and to said audible signal means for providing a transmission signal for a selected time duration.

References Cited

UNITED STATES PATENTS

| | | | |
|---|---|---|---|
| 1,765,598 | 6/1930 | McCoy et al. | |
| 3,029,642 | 4/1967 | Burhans et al. ------ | 179—2 X |

JOHN W. CALDWELL, *Primary Examiner.*

J. T. STRATMAN, *Assistant Examiner.*